Feb. 4, 1947.  J. G. WHITING  2,415,120
LIGHT PROJECTOR
Filed May 24, 1943  4 Sheets-Sheet 1
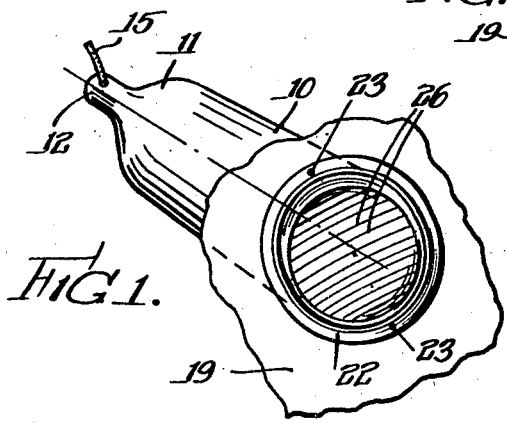
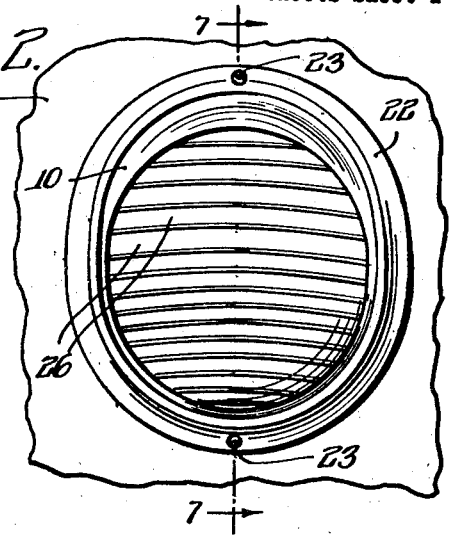
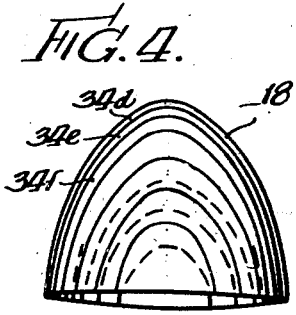
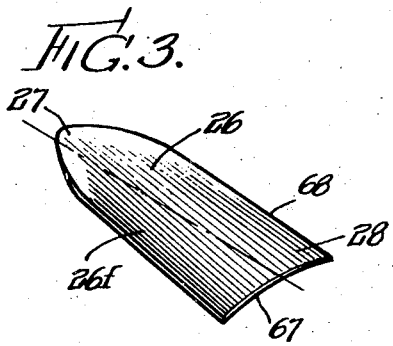
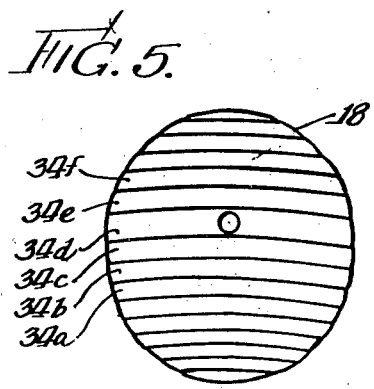
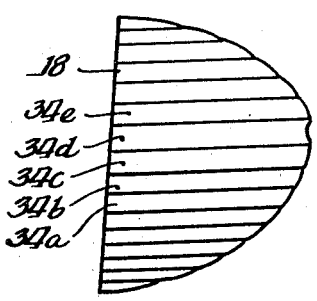
INVENTOR.
John G. Whiting
BY Loftus, Moore, Olson & Trexler
ATTORNEYS.

Feb. 4, 1947.  J. G. WHITING  2,415,120
LIGHT PROJECTOR
Filed May 24, 1943  4 Sheets-Sheet 2
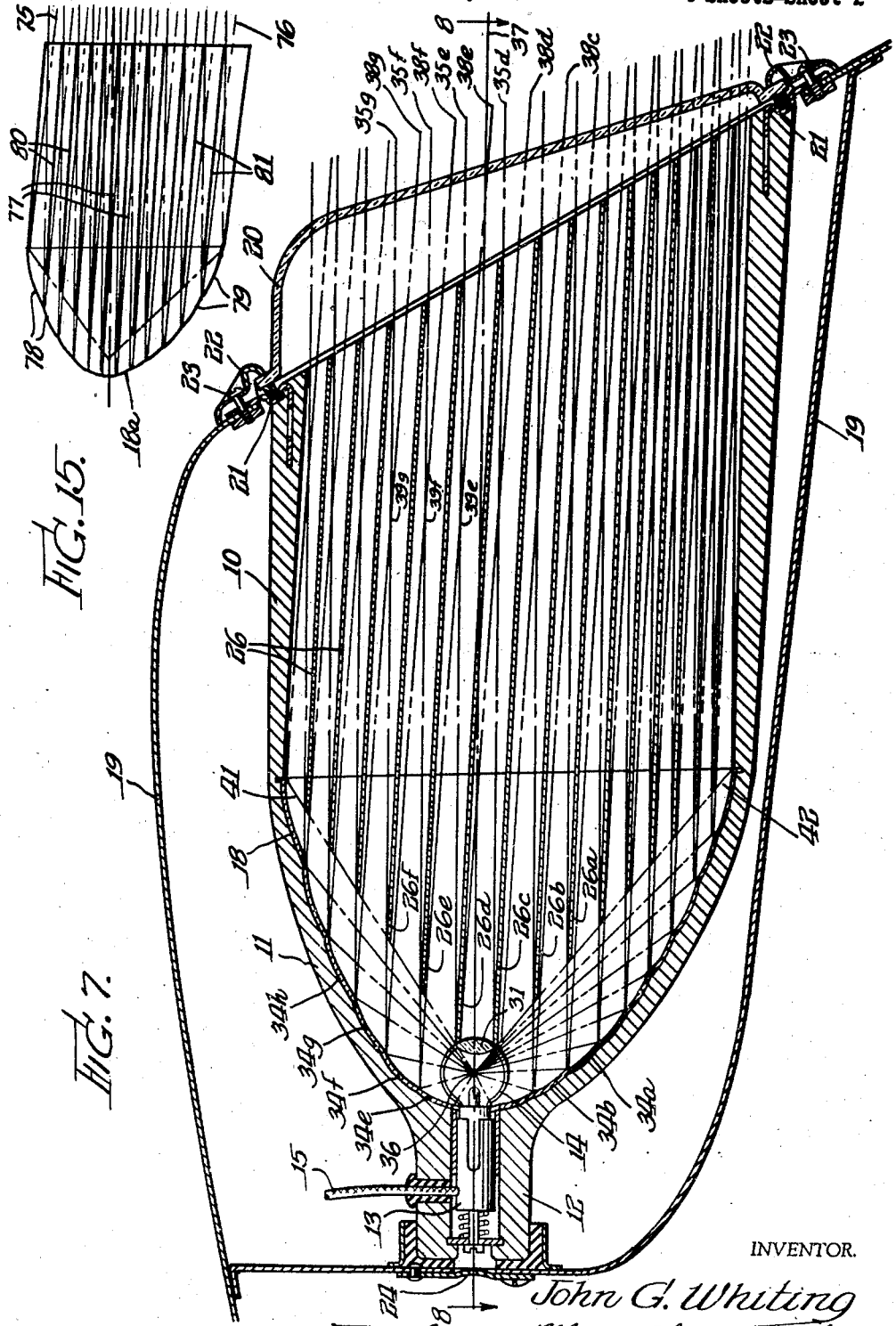
INVENTOR.
John G. Whiting
By: Loftus, Moore, Olson & Trexler attys

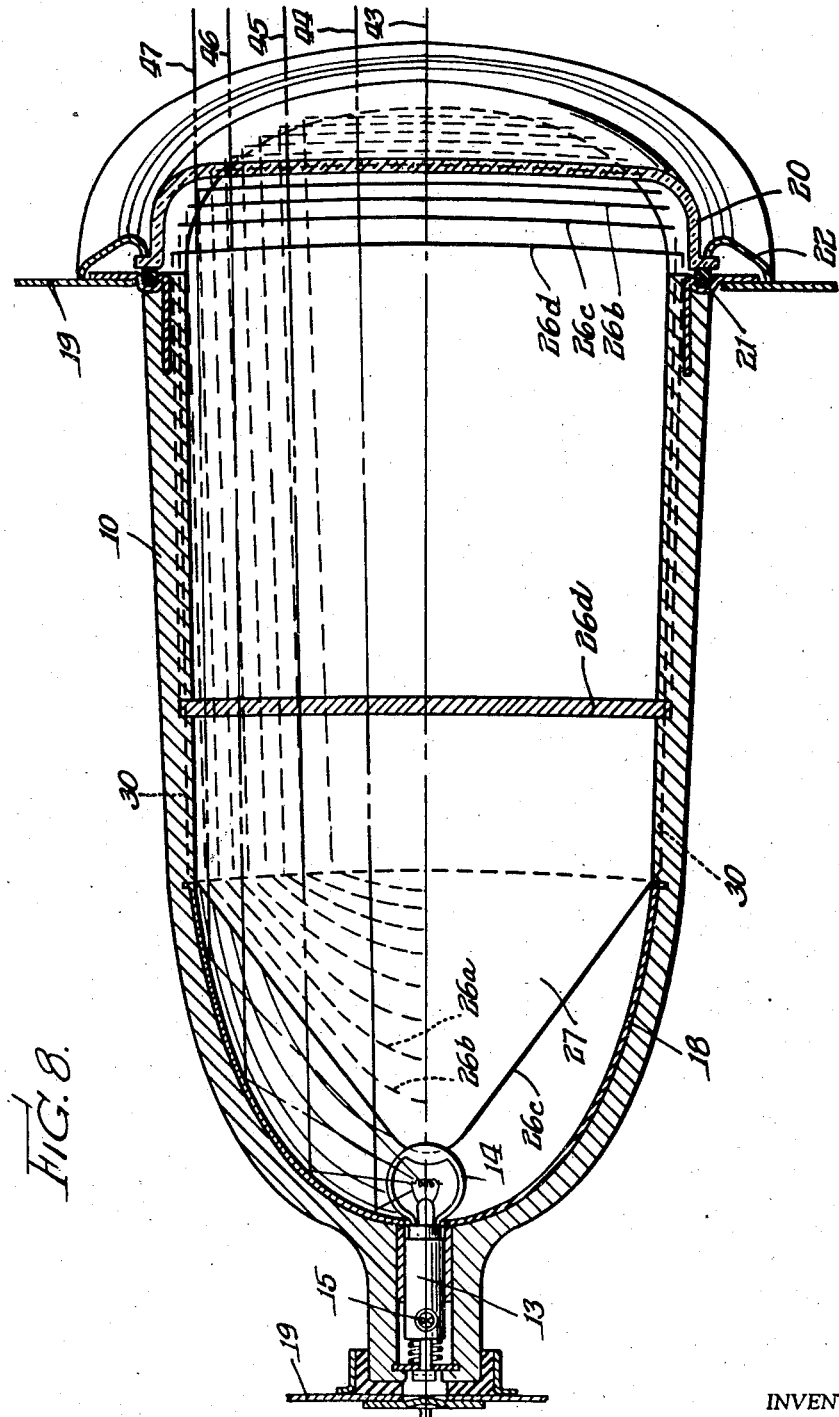

Feb. 4, 1947. J. G. WHITING 2,415,120
LIGHT PROJECTOR
Filed May 24, 1943 4 Sheets-Sheet 4
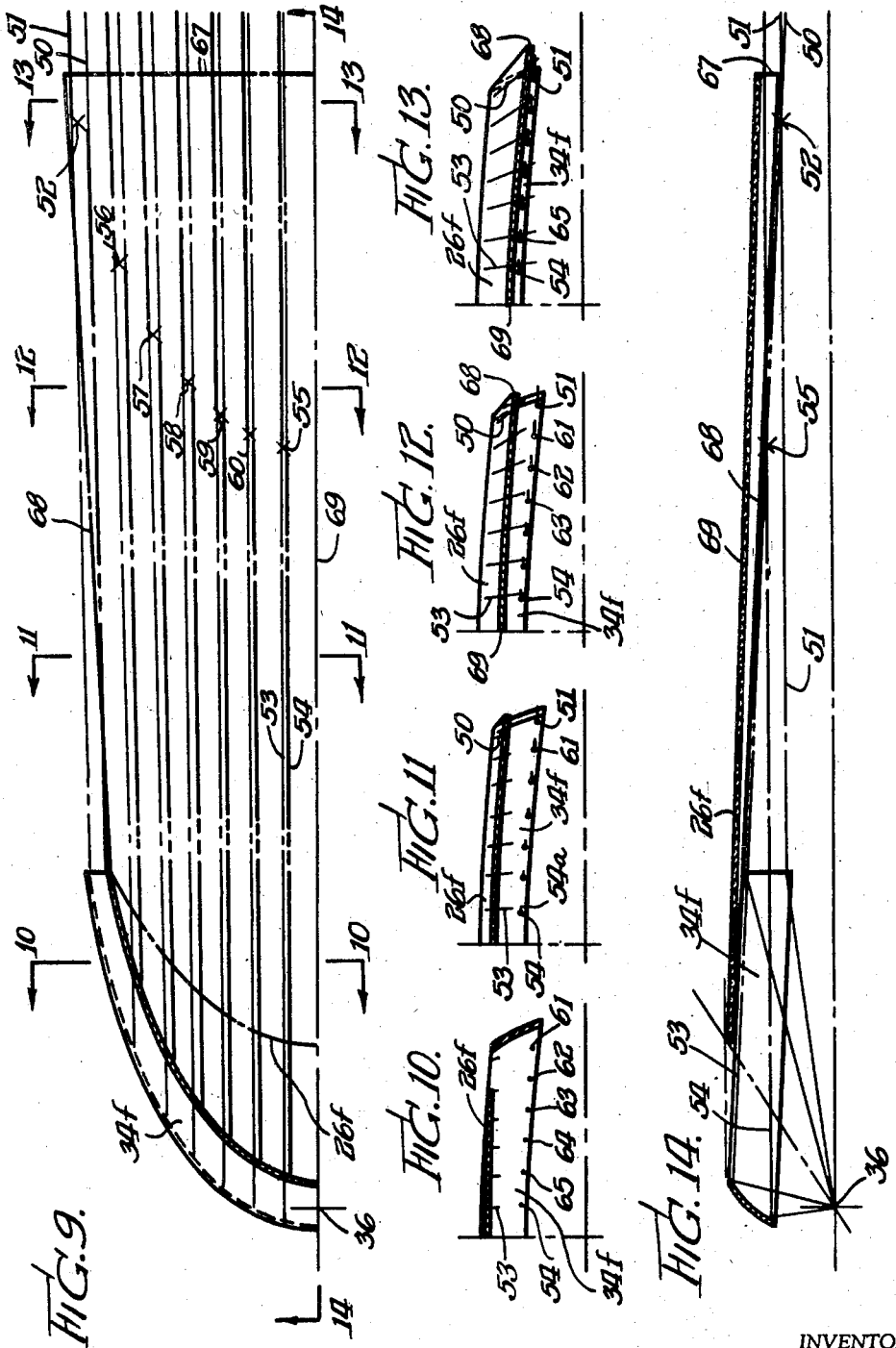
INVENTOR.
John G. Whiting
BY Loftus, Moore, Olsen and Trexler
attys.

Patented Feb. 4, 1947

2,415,120

UNITED STATES PATENT OFFICE 2,415,120

LIGHT PROJECTOR

John G. Whiting, Chicago, Ill.

Application May 24, 1943, Serial No. 488,159

12 Claims. (Cl. 240—41.36)

This invention relates to light projectors, and to means and methods for controlling and projecting light.

It is an object of the invention to provide a light projector of improved construction and operating characteristics.

More specifically it is an object of the invention to provide means and methods for projecting light from a suitable light source in a controlled pattern to an object or objects to be illuminated.

A further object of the invention is to provide a light projector which will direct light from a source at a maximum desired intensity to an object or objects to be illuminated, while efficiently and effectively blocking off substantially all or a given amount of the light from a position adjacent the illuminated zone.

A still further object of the invention is to provide an improved reflector.

Another object is to provide in cooperation with the reflector, improved shielding means for insuring a controlled pattern of light from the reflector to an illuminated zone.

Various other objects, advantages and features of the invention will be apparent from the following specification, when taken in connection with the accompanying drawings, wherein certain preferred embodiments of the invention are set forth for illustrative purposes.

In the drawings, wherein like reference numerals refer to like parts throughout:

Fig. 1 is a general assembly view, in perspective, of a light projector constructed in accordance with and embodying the principles of the invention;

Fig. 2 is a front view of the structure of Fig. 1, on an enlarged scale;

Fig. 3 is a detail perspective view of one of the baffle or shielding elements, as utilized in the structure of Fig. 1;

Figs. 4, 5 and 6 are top, front and side views, respectively, of the reflector element used in the light projector structure of Fig. 1;

Fig. 7 is a vertical, longitudinal, sectional view through the projector on a further enlarged scale, somewhat diagrammatic in form, and taken as indicated by the line 7—7 of Fig. 2;

Fig. 8 is a horizontal, longitudinal, sectional view through the projector taken as indicated by the line 8—8 of Fig. 7;

Fig. 9 is a detail illustrative plan view of a part of one of the reflecting areas of the reflector;

Figs. 10, 11, 12 and 13 are sectional, illustrative views taken as indicated, respectively, by the lines 10—10, 11—11, 12—12 and 13—13 of Fig. 9;

Fig. 14 is a vertical illustrative view of the reflector area of Fig. 9 taken as indicated by the line 14—14 thereof; and Fig. 15 is a diagrammatic view, generally similar to Fig. 7, but illustrating a modified embodiment of the invention.

In the drawings, the invention has been shown for purposes of illustration embodied for use as a light projector or headlight for vehicles such as automobiles or the like. However, it is to be understood that the principles of the invention, and the light projector provided, are adapted for various other uses including uses as flood lights, search lights, and light projectors generally. In this connection the projector may be used in various positions of inclination, or inverted, and the reflecting areas of the reflector, and shielding means, may be variously arranged in accordance with the requirements of the particular installation and use, as will be pointed out hereinafter.

This application is a continuation-in-part of my copending application, Serial No. 305,752, filed November 24, 1939, and entitled "Light projector."

Referring more particularly to the drawings, and first to the embodiment illustrated in Figs. 1 to 14 inclusive, it will be seen that the light projector or head lamp provided comprises an elongated casing 10, Figs. 1 and 7, of generally cylindrical form, open at its forward end, and closed at its rear end by a generally conically shaped portion 11. This conical end portion is provided with an extension 12 adapted to receive an electric socket 13, Fig. 7, carrying a light bulb or lamp 14. The details of the socket structure are not material to the invention and any suitable type of socket may be used. The socket is provided with electric conductors or wire as indicated at 15, adapted to be connected to a suitable source of current supply.

The conical end portion 11 of the casing 10 is adapted to receive a reflector 18, the details of which will be later described. The casing 10 may be of plastic or other suitable molded structure, and to this end may be molded to conform to and embrace the metallic reflector, as shown.

In the particular embodiment illustrated, the forward end of the cylindrical casing member terminates at an angle with respect to its longitudinal axis, for general conformity with the frame structure 19 forming a part of the vehicle and by means of which the projector is supported. The open end of the casing is closed by means of a glass plate or closure member 20, Fig. 7, the flange of which is adapted to bear against a sealing gasket 21. The flange is held against the gasket by means of a bezel ring 22 held in position by screws 23. By means of the described structure a dust and moisture-proof seal is provided for the front end of the casing, whereby to protect the reflector 18 from moisture and the elements. Sealing means, as indicated at 24 in Fig. 7, may be provided for sealing the socket structure 13. The glass plate 20 may be plain glass in the particular embodiment illustrated, the reflector and associated shielding means, now to be described, being relied upon to control the light rays. However, a frosted or other embossed or configured glass member may be utilized if desired.

A series of baffles or shields 26 are disposed in superposed relationship within the casing 10. The shaping of these shields, and their arrangement with respect to the casing 10 and the reflector 18 will be best understood by reference to Figs. 2, 3, 7 and 8. More particularly, the baffles or shields comprise thin plates, of metal or other suitable material. While the plates are generally flat in character, they are curved somewhat transversely, as will perhaps best be seen in Figs. 2 and 3, being of progressively increasing curvature from the rear 27 to the front 28 thereof. The particular or detailed shaping of the plates will be more specifically hereinafter described. The plates or shields are generally horizontally disposed within the casing 10, in parallel relationship, and in the particular embodiment illustrated are inclined slightly downwardly at their forward ends with respect to the general longitudinal axis of the projector, as best shown in Fig. 7. The rear end 27 of each plate is tapered or pointed in shape so as to project a predetermined distance into the reflector, each plate projecting a different amount into the reflector, as will be best understood from Figs. 7 and 8. For example, the ends of the plates 26c and 26d project a maximum distance into the reflector, whereas the plates 26b and 26a project in lesser amounts. The plates may conveniently be held in position by slots 30, Fig. 8, formed in the walls of the casing 10.

The lamp bulb 14 is provided with a condensing lens 31, Fig. 7, arranged between the plates 26c and 26d.

Having now described the principal elements of the projector structure, the more specific arrangements and details thereof will now be discussed.

Referring particularly to Figs. 4, 5, 6 and 7, it will be seen that the reflector 18 is shaped to provide a series of generally horizontally extending paraboloidal reflecting areas 34a, 34b, 34c, et cetera. These areas are individually concavely curved in vertical section, as will be seen from Fig. 7, and extend substantially horizontally across or transversely of the dished reflector 18. There is one paraboloidal reflecting area for each of the several baffles or shields 26. In accordance with the principles of the invention, these reflecting areas are so shaped as to project the rays from the light source filament or focal point of the reflector, indicated by the numeral 36, Fig. 7, into a series of generally horizontal crossed beam light bands, projected, respectively, between the baffles or shields 26. More specifically, in the particular embodiment illustrated, the rays reflected from the lowermost surfaces of each paraboloidal reflecting area, such rays being indicated by the numerals 35e, 35f, 35g, et cetera, in Fig. 7, will be reflected in a substantially horizontal direction, or parallel with the general horizontal axis 38 of the projector. The rays projected from the central portion of the lower edge of each area, however, are vertically above the other horizontal rays, the horizontal rays being progressively lower from the center to each end of the lower edge of the area, as will be later more particularly described in reference to illustrative Figs. 9–14. The rays reflected from the uppermost surfaces of each of the paraboloidal areas will be reflected downwardly in a flat plane at a predetermined desired angle of declination, as indicated at 38e, 38f, 38g, et cetera, in Fig. 7; and the rays reflected from the surfaces of each paraboloidal area between the lower and upper edges will be projected at uniformly varying angles between the limits defined, whereby to provide converging or crossed beams, intersecting between the shields as indicated at 39e, 39f, 39g, et cetera, in Fig. 7. The point of convergence, however, progressively varies along the length of the paraboloidal area, as will also be more particularly described in reference to Figs. 9 and 14.

In proportioning and shaping the reflector, in accordance with the principles of the invention, a number of factors, some of which are empirical, are taken into consideration. In the first place, the intensity of illumination desired is known, and this in general determines the size of the lamp bulb 14 of the light source, which in turn limits the minimum parameter of the central paraboloidal reflecting area 34d, it being preferable to utilize a minimum parameter so as to decrease the size of the completed reflector. Also, the maximum desired declination of the light rays, for example as indicated by the lines 38e, 38f, 38g, et cetera, is known, this being determined by the reflected light pattern desired. For example, in the structure shown in Fig. 7, the maximum angle of declination is illustrated as being on the order of three or four degrees, which would provide a suitable road pattern for a headlight structure as shown.

Referring, for example, to the central paraboloidal area 34d of the reflector, the lower and upper limits of this area may be considered as being determined, respectively, by horizontally transverse planes coincident with the lines 38c and 38d. The lower edge of this paraboloidal area must lie within a true parabolic surface (disregarding the slight horizontal spread of the reflector) having its focal point at 36, in order that horizontal rays will be reflected therefrom. Accordingly the lower edge of the area 34d will comprise and may be considered as the intersection of a horizontally transverse inclined plane coincident with the line 38c, and a parabolic surface having the focal point 36 and the parameter determined by the size of the bulb 14. From the lower edge thus determined the paraboloidal area 34d may then be considered as being progressively developed upwardly to provide the uniform progressive depression of the reflected rays, as hereinbefore described. The upper edge of the area 34d, which is coincident with the lower edge of the area 34e, will constitute the intersection of the plane coincident with the line 38d and a parabolic surface, again having the focal point 36, but of different parameter. By repetition of this process the several paraboloidal areas of the reflector may be developed, the edges of the areas thus in effect being the intersection between a series of inclined planes, coincident with the lines 38c, 38d, 38e, et cetera, and parabolic surfaces having a common focal point 36 and a series of different parameters. In other words (and again disregarding the slight horizontal spread of the reflector), the lower edge of each paraboloidal area is a true parabolic surface of a given parameter and having the focal point 36, said edge constituting the intersection of such parabolic surface and an inclined plane horizontal transversely but inclined forwardly as indicated by the lines 38d, 38e, 38f, et cetera. When viewed from the front, the edges of the paraboloidal areas are curved as indicated in Fig. 5. When viewed from the side, as seen in Fig. 6, they are straight and inclined at an angle corresponding to the lines 38d, 38e, 38f, et cetera.

It is further desirable to cause a maximum amount of the light emitted from the light source to be projected against the surfaces of the reflector, without unduly enlarging the reflector, and in the embodiment shown in Fig. 7 it will be seen that the major portion of the emitted light from the focal point 36 is projected against the surfaces of the reflector between the upper and lower boundary lines as indicated at 41 and 42, respectively. The remaining light which is emitted between these boundary lines, and which does not strike the surface of the reflector, is transmitted through the condensing lens 31, and is condensed vertically thereby into a substantially flat horizontal beam projected between the shields 26c and 26d, and with only the desired horizontal spread. It will be seen that the ends 27 of the several shields are shaped, Figs. 7 and 8, so as to extend up to but not interfere with the rays projected from the light source onto the surfaces of the reflector.

The horizontal spread of the reflector, heretofore referred to, is indicated in Fig. 8 wherein it will be seen that rays projected from any given paraboloidal area diverge very slightly horizontally as indicated at 43, 44, 45, 46 and 47, to give the desired horizontal spread to the light pattern.

In Figs. 9 to 14 inclusive, the specific action of the paraboloidal areas in the reflecting of the light rays therefrom is diagrammatically illustrated. For illustrative purposes, one-half of the paraboloidal area 34f is shown. Referring to Figs. 9 and 14, the rays transmitted from the focal point 36, and reflected from the outer edge of the paraboloidal area are indicated at 50 and 51, 50 being the ray reflected from the upper surface of the paraboloidal area, and 51 being the ray reflected from the lower surface. It will be seen that the rays cross at a point indicated at 52, and it will be understood that all of the rays projected from the outer edge of the paraboloidal area will cross at this same point 52. In Fig. 9, while the rays must be shown as parallel lines, the point of crossing is indicated, and the uppermost of the two rays at any point is indicated by the heavier line. The rays 53 and 54 reflected, respectively, from the upper and lower portions of the central part of the surface 34f, and all other rays reflected from such central portion, will cross at a point indicated by the numeral 55. In similar manner the crossing points of the rays, as reflected from various other portions of the area 34f, are as indicated at 56, 57, 58, 59 and 60 in Fig. 9. It will be seen that the rays cross in each instance at substantially the same distance forwardly from the reflector surface from which they are projected, but at different distances when considered with respect to a given transverse plane across the projector structure.

The shields 26, provided for the purpose of precluding stray or splash rays from deviating from the desired road pattern, and for shielding the reflector from the horizontal front, are designed to conform to the projection of the rays from the several paraboloidal reflector areas of the reflecting structure. More specifically, as previously stated and as best shown in Figs. 10, 11, 12 and 13, it will be seen that the horizontal rays reflected from the lower edge of the paraboloidal surface, such as the rays 51 and 54, and additional rays as indicated at 61, 62, 63, 64 and 65, when viewed from the front of the projector, form a generally curved pattern, the central rays, such as the ray 54, being vertically higher than the outer rays, such as the ray 51. The forward edge 67 of the shield is shaped to conform to this pattern. The outer edge of the shield, as indicated at 68, is inclined downwardly at the same angle as the rays of maximum declination, such for example as the rays 50 and 53, whereby to effectively screen the outer part of the paraboloidal reflecting area when viewed from the horizontal front of the projector. On the other hand, the central portion of the shield, as indicated at 69, is inclined downwardly at a lesser angle, to shield the central part of the area. Accordingly the shields are shaped of a progressively increasing curvature as heretofore discussed in reference to Fig. 3, when considered from the rear to the front thereof, the outer edges of the shield being declined at the maximum angle of declination of the rays, and the central portion of the shield being declined at a lesser angle just sufficient to permit the passage of the uppermost horizontally projected ray projected from the lower central edge of the paraboloidal reflecting area. The manner in which the shield effects the screening of the paraboloidal reflecting area, when the projector is viewed from the horizontal front is indicated by the respective sectional views shown in Figs. 10, 11, 12 and 13. It will be seen that in Fig. 13, a major screening has been effected, which becomes substantially complete when the reflector is considered in its entirety. In Fig. 11 the tail portion, for example as indicated at 54a, of the ray 54, denotes the horizontal spread of the reflector, heretofore mentioned. It will be seen that the inclined rays, such as the ray 53 in Fig. 11, also have a slight horizontal increment.

As has been stated, the outer edges of the shields are depressed at the angle of declination of the maximum declined rays, and they cannot be inclined at a greater angle without interference with the rays. On the other hand, the length of the shields is limited by the practical length of the casing 10. These two factors therefore, the maximum permissible length of the shields, and the maximum permissible inclination thereof at the outer edges, determine the maximum possible height of the paraboloidal areas to be screened. It will be found that when the maximum declination of the rays from the several paraboloidal areas is the same, as in Fig. 7, the vertical height of the paraboloidal areas decreases in the upper and lower edges of the reflector, requiring a closer spacing of the shields at the upper and lower reflector portions. In Fig. 15 a modified embodiment is illustrated wherein the maximum declination of the rays from the upper and lower paraboloidal areas, for example as indicated at 75 and 76 is greater than the maximum declination of the rays from the middle paraboloidal areas, for example as indicated at 77. Thus, in Fig. 15 the declination of the rays 75 and 76 may be on the order of six degrees, substantially twice the declination of the rays 77. The progressive increase of the maximum declination of the rays towards the upper and lower portions of the reflector results in the increased size of the upper and lower paraboloidal bands or areas as indicated at 78 and 79, and also a greater spacing between the shields and a greater inclination thereof at the upper and lower portions of the reflector, as indicated at 80 and 81. It will thus be seen that by varying the maximum declination of the rays projected from the respective paraboloidal areas, different vertical heights of the areas, and different shield spacing and angularity will be obtained.

While in the drawings, for example in Fig. 7, the general longitudinal axis 37 of the projector has been indicated as horizontally disposed, it is to be understood that the reflector may be bodily tilted downwardly one or more degrees, if desired, when set into the frame 19. In accordance with the invention the generally horizontal paraboloidal reflecting areas produce horizontally disposed cross beams of light, projected in a desired controlled pattern, and between which the baffles or shields 26 may be disposed without interference with the reflected rays. The under surfaces of the shields, which may be plated, if desired, may be utilized to reflect down onto the road pattern any stray or splash rays. From the horizontal front of the projector the surfaces of the reflector 18 are not visible, and only the upper surfaces of the shields 26 may be seen. By suitably treating or painting these surfaces different desired effects may be produced. For example, if the upper surfaces of the shields are painted black a substantially invisible projector structure, from the horizontal front, may be provided, whereas by imparting a polish or lighter color to the shield upper surfaces a desired dull glow of light, from splash rays, may be obtained. Or by making the shields translucent a desired glow of light may also be secured. The curvature of the shields, heretofore discussed, serves also as a means for collecting the stray rays which tend to diverge laterally, and keep them within the desired lateral limits of the light pattern and reflector structure.

It is obvious that various changes may be made in the specific embodiments of the invention set forth for purposes of illustration without departing from the spirit thereof. For example, the projector may be mounted in any manner, and the paraboloidal reflecting areas and shield spacing variously proportioned, or the shield angularity and divergence of the rays variously disposed and arranged. Accordingly, the invention is not to be limited to the specific embodiments shown and described, but only as indicated in the following claims.

The invention is hereby claimed as follows:

1. A light projector comprising a generally conical reflector, said reflector having a plurality of reflecting areas extending transversely across the reflector, each area being concavely curved to reflect a band of cross rayed light from a light source, said areas being shaped transversely and in concave curvature to effect the convergence of the rays from each of said areas along a substantially parabolic line, at least one marginal surface of each of said areas being parabolic in form, and said surfaces having a common focus but being of progressively different parameter.

2. A light projector comprising a generally conical reflector, said reflector having a plurality of reflecting areas extending generally horizontally across the reflector, each area being concavely curved to reflect a band of cross rayed light from a light source, said areas being shaped horizontally and in concave curvature to effect the convergence of the rays from each of said areas along a substantially parabolic line, the marginal edges of said areas being in contact and being curved when viewed parallel to the general longitudinal axis of the reflector.

3. A light projector comprising a generally conical reflector, said reflector having a plurality of reflecting areas extending transversely across the reflector, each area being concavely curved to reflect a band of cross rayed light from a light source, the convergence of the rays from each of said areas being along a substantially parabolic line, and the marginal edges of said areas lying within planes angularly disposed to the general longitudinal axis of the reflector.

4. A light projector as defined in claim 3, wherein said planes are relatively parallel to each other.

5. A light projector as defined in claim 3, wherein said planes are of progressively changing angle with respect to the longitudinal reflector axis.

6. A light projector comprising a generally conical reflector, said reflector having a plurality of reflecting areas extending transversely across the reflector, each area being concavely curved to reflect a band of cross rayed light from a light source, and the marginal edges of said areas lying within planes angularly disposed to the general longitudinal axis of the reflector, and a plurality of shielding devices comprising a plurality of superposed plates disposed between said bands, said plates having portions disposed substantially parallel to the surfaces of said planes.

7. A light projector comprising a generally conical reflector, said reflector having a plurality of reflecting areas extending transversely across the reflector, each area being concavely curved to reflect a band of cross rayed light from a light source, and the marginal edges of said areas lying within planes angularly disposed to the general longitudinal axis of the reflector, and a plurality of shielding devices comprising a plurality of superposed plates disposed between said bands, said plates being curved in a direction transversely of the reflector and having portions disposed substantially parallel to the surfaces of said planes.

8. A light projector comprising a generally conical reflector, said reflector having a plurality of reflecting areas extending across the reflector in parallel relationship, each area being concavely curved to reflect a band of cross beamed light from a light source, and the marginal edges of said areas lying within planes angularly disposed to the general longitudinal axis of the reflector, and a plurality of shielding devices comprising a plurality of superposed plates disposed between said bands, said plates being of progressively increasing transverse curvature in a direction extending away from the reflector.

9. In a light projector, a generally dished reflector having a plurality of transversely extending parallel areas, said areas sloping forwardly and downwardly from the center towards the ends thereof when the general axis of the reflector is horizontally disposed, and each of said areas being concavely curved to reflect a band of cross rayed light from a light source with the uppermost rays emanating from each area being projected in a forward and downward direction, and the lowermost rays emanating from each area being projected substantially horizontally, and the convergence of the rays from each area being along a substantially parabolic line, all of said areas having a common focus coincident with the light source.

10. A light projector as defined in claim 9, wherein shielding means comprising a plurality of plates is disposed within the projector between said crossed rays, said shielding means having surfaces substantially parallel to the uppermost rays projected from said areas.

11. A light projector as defined in claim 9, wherein shielding means comprising a plurality of plates is disposed within the projector between said crossed rays, said shielding means having surfaces substantially parallel to the uppermost rays projected from said areas, and wherein said light source comprises a condensing lens for condensing and directing between two adjacent shields rays projected from the light source beyond the limits of the reflector.

12. A light projector comprising a generally conical reflector, said reflector having a plurality of reflecting areas extending generally transversely across the reflector, each area being concavely curved to reflect a band of cross rayed light from a light source, said areas being shaped transversely and in concave curvature to effect the projection of the lowermost rays emanating from each area substantially parallel to the general axis of the reflector and the uppermost rays emanating from each area in a predetermined angular relationship in respect thereto, and to effect the convergence of the rays from each of said areas along a substantially parabolic line.

JOHN G. WHITING.

REFERENCES CITED

The following references are of record in the file of this patent:

UNITED STATES PATENTS

| Number | Name | Date |
|---|---|---|
| 1,199,971 | Heckert | Sept. 26, 1916 |
| 1,621,585 | Godley | Mar. 22, 1927 |
| 2,033,387 | Michel, et al. | Mar. 10, 1936 |
| 1,928,537 | Labastrou | Sept. 26, 1933 |
| 1,521,833 | Paul | Jan. 6, 1925 |
| 2,044,224 | Peple | June 16, 1936 |
| 2,102,928 | Van Leunen | Dec. 21, 1939 |
| 1,585,852 | Gowdy | May 25, 1926 |

FOREIGN PATENTS

| Number | Country | Date |
|---|---|---|
| 265,177 | British | 1927 |